US006289315B1

(12) United States Patent
Calvi

(10) Patent No.: US 6,289,315 B1
(45) Date of Patent: Sep. 11, 2001

(54) CREDIT CARD SWIPE SYSTEM

(76) Inventor: Michael F. Calvi, 7 Pond La., Linwood, NJ (US) 08221

( * ) Notice: Subject to any disclaimer, the term of this patent is extended or adjusted under 35 U.S.C. 154(b) by 0 days.

(21) Appl. No.: 09/281,143

(22) Filed: Mar. 29, 1999

(51) Int. Cl.[7] .............................. H04H 1/00; G06F 17/60
(52) U.S. Cl. ............................................. 705/1; 235/30 R
(58) Field of Search ................... 705/13, 40, 7, 705/16

(56) References Cited

U.S. PATENT DOCUMENTS

| | | | |
|---|---|---|---|
| 4,389,563 | 6/1983 | Ricard | 377/20 |
| 4,409,685 | 10/1983 | Ricard | 377/20 |
| 4,539,644 | 9/1985 | Adams et al. | 364/467 |
| 4,882,681 | * 11/1989 | Brotz | 364/419 |
| 5,272,747 | * 12/1993 | Meads | 379/59 |
| 5,274,561 | 12/1993 | Adams et al. | 364/467 |
| 5,397,880 | 3/1995 | Georgilis | 235/33 |
| 5,828,044 | * 10/1998 | Jun et al. | 235/380 |
| 5,828,738 | * 10/1998 | Spaeth | 379/130 |

FOREIGN PATENT DOCUMENTS

757454-A1  *  2/1997  (EP) ................... H04H/1/00

OTHER PUBLICATIONS

"The power of speech (automatic speech recognition)", Judith Moskowitz; AI Expert, v8, n1, p28+; Jan. 93.*

* cited by examiner

Primary Examiner—James P. Trammell
Assistant Examiner—Calvin Loyd Hewitt, II
(74) Attorney, Agent, or Firm—Henderson & Sturm LLP

(57) ABSTRACT

The present invention provides an electronic credit card swipe system for the transportation industry. One embodiment has a currency conversion feature and a voice synthesizer that recites the fare in both the local language and a selected one of a number of foreign language options. The customer card swipe box is located in the passenger compartment and the driver control box is located in the front of the taxi readily accessible to the driver.

1 Claim, 3 Drawing Sheets

CREDIT CARD SWIPE SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of fare metering, and more particularly to an electronic credit card swipe system for the transportation industry.

2. Description of Related Art

As can be seen by reference to the following U.S. Pat. Nos. 4,389,563; 4,409,685; 4,539,644; 5,274,561 and 5,397,880, the prior art is replete with myriad and diverse fare metering devices.

While all of the aforementioned prior art constructions are more than adequate for the basic purpose and function for which they have been specifically designed, they are uniformly deficient with respect to their failure to provide a simple, efficient, and practical electronic credit card swipe system for taxis.

As a consequence of the foregoing situation, there has existed a longstanding need for a new and improved electronic credit card swipe system for taxis and the provision of such a construction is a stated objective of the present invention.

BRIEF SUMMARY OF THE INVENTION

Briefly stated, the present invention provides an electronic credit card swipe system for the transportation industry. One embodiment has a currency conversion feature and a voice synthesizer that recite the fare in both the local language and a selected one of a number of foreign language options. The customer card swipe box is located in the passenger compartment and the driver control box is located in the front of the taxi readily accessible to the driver.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
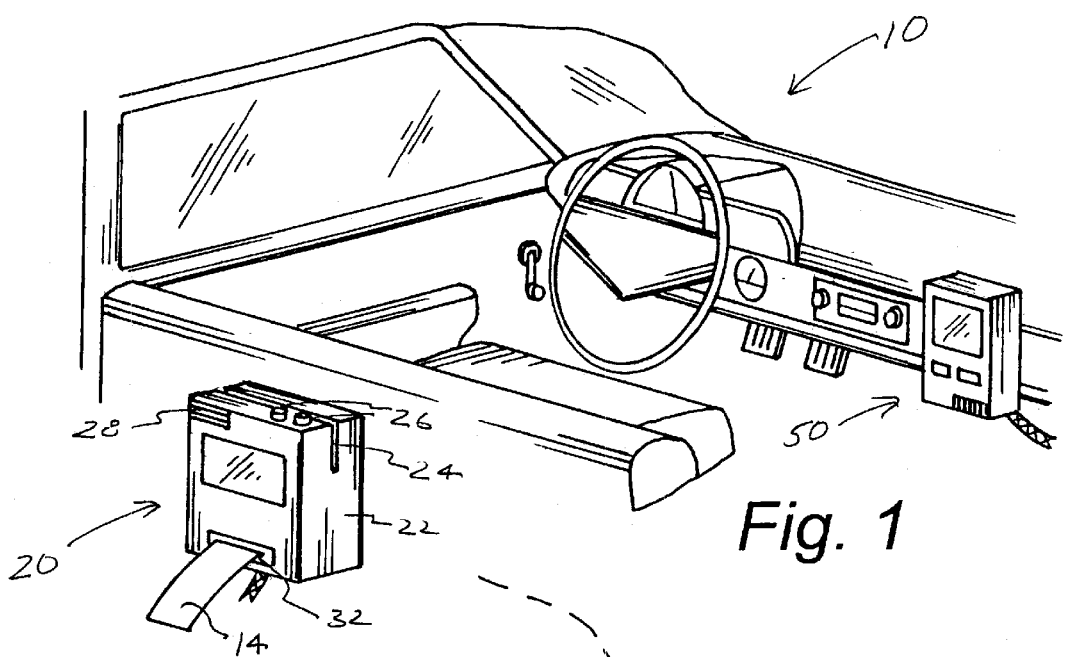
FIG. 1 is a partial perspective view of the interior of a taxi using the electronic credit card swipe system of the present invention.
Figure 2:
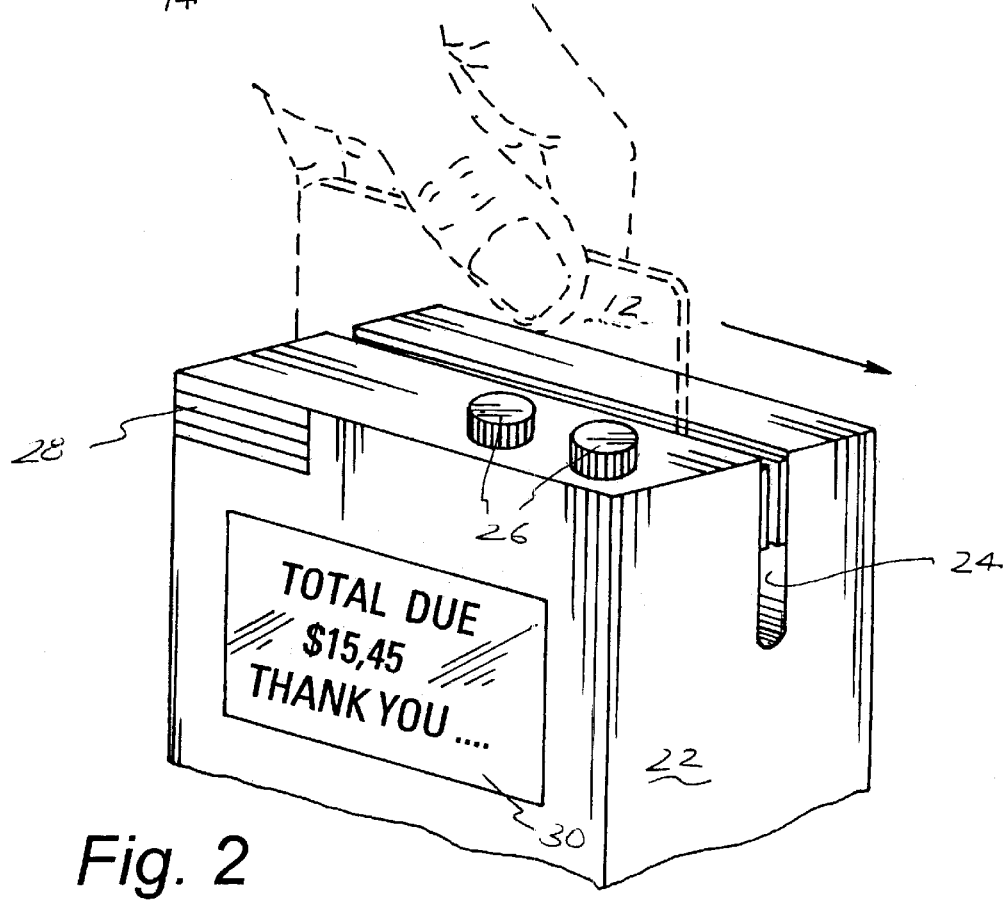
FIG. 2 is an enlarged partial perspective view of the customer box with a dashed line illustration of a customer swiping a credit card through the card slot of the box.

As can be seen by reference to the drawings, and particularly to FIG. 1, the taxi credit card swipe system that forms the basis of the present invention is designated generally by the reference number 10. The system 10 includes a customer card swipe box 20 located in the passenger compartment of a taxi, and a driver control box 50 located in the front of the taxi accessible to the driver.

Figure 5:
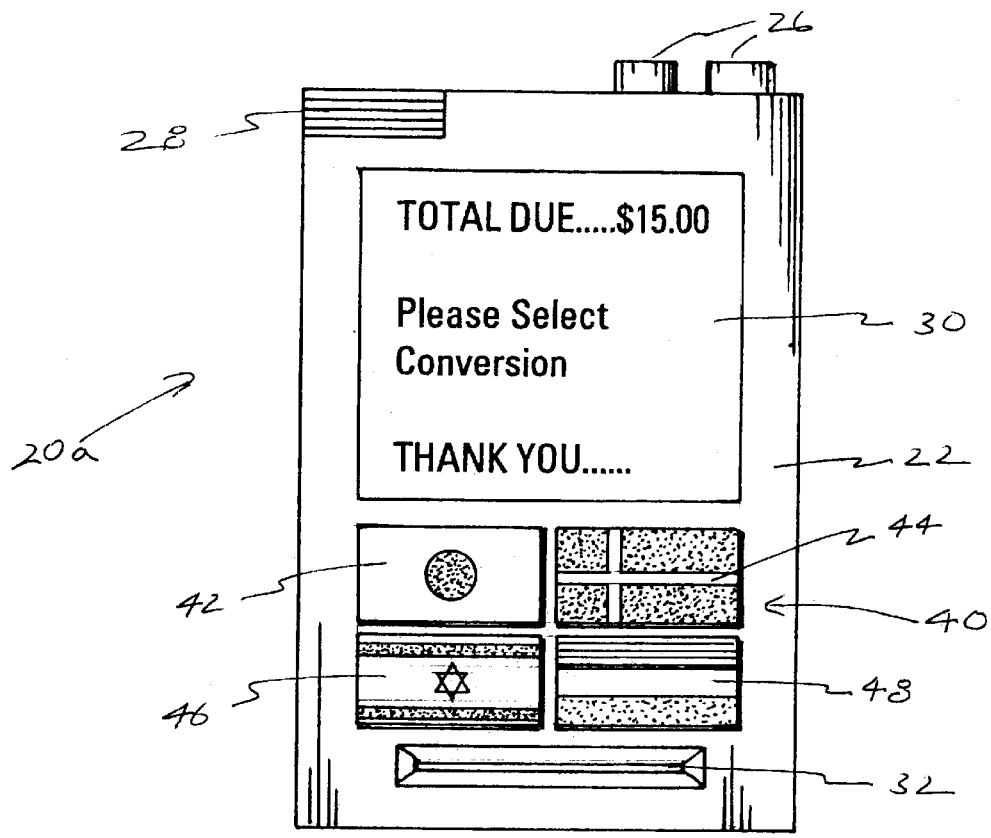
FIG. 5 is a front elevational view of the international version of the system.
Figure 6:
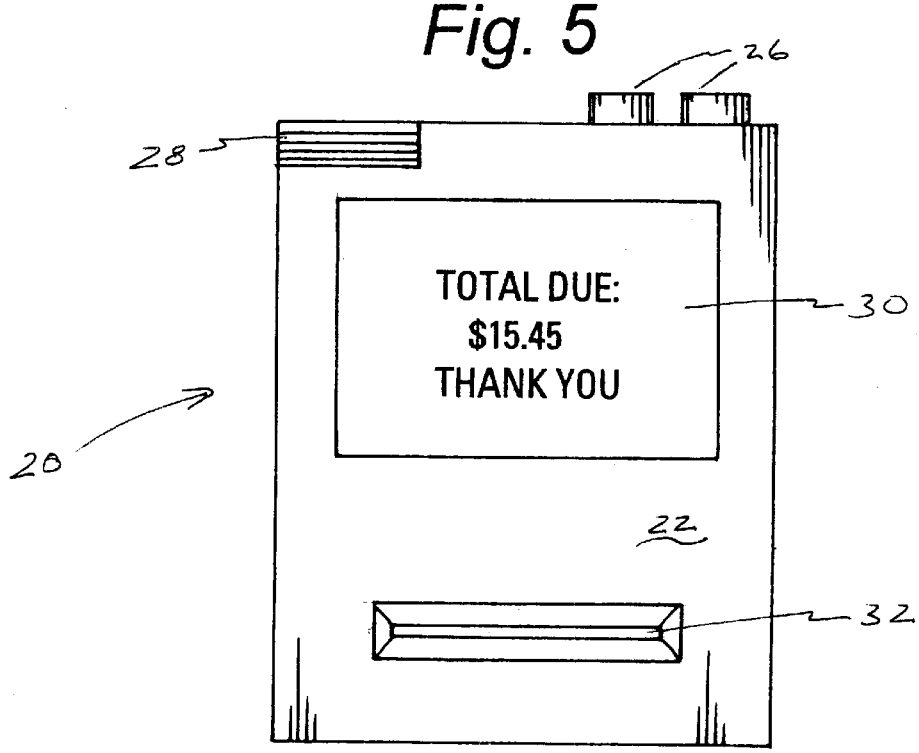
FIG. 6 is a front elevation view of the American version of the system.

The American version of the customer box 20 shown in FIG. 6 includes a housing 22, a card slot 24, card validity indicator lights 26, a speaker 28, a display screen 30, and a receipt port 32. The international version of the customer box 20a, shown in FIG. 5, includes all the components of the American version 20 and in addition includes an array 40 of accuator buttons 42, 44, 46 and 48, each representing a separate non-English speaking country.

Figure 3:
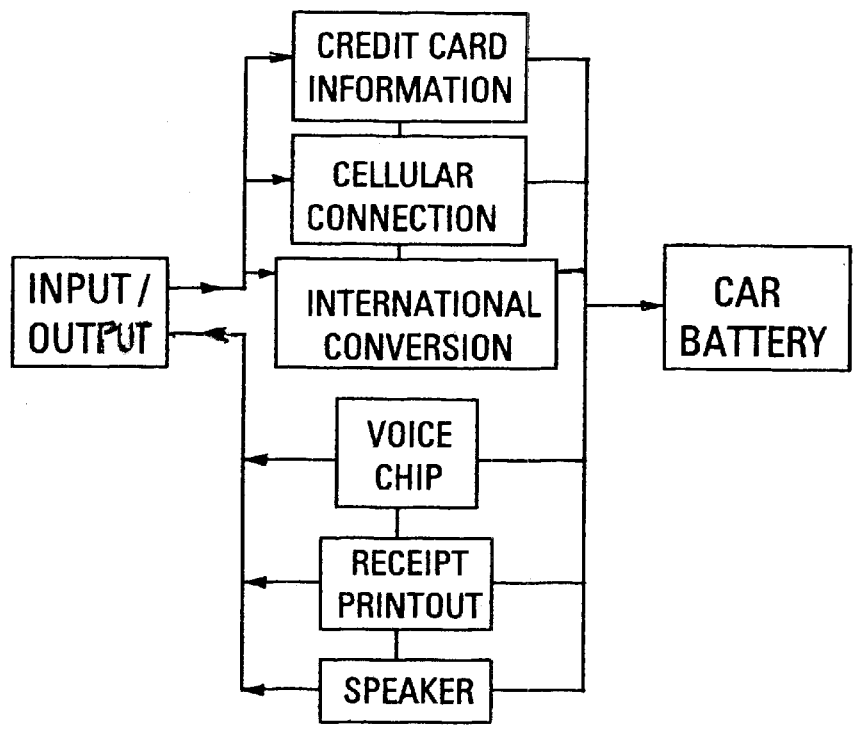
FIG. 3 is a schematic of the system.

The plastic casing 22 contains the necessary components to make the system 10 work: the cellular connection, counting devices for tabulating the fare, the voice chip and the receipt printout, all of which are shown schematically in FIG. 3. The housing 22 is attached to the back seat of the taxi and is very easy to use for the patron.

The slot 24 where the credit card 12 is swiped has the capability to accept either a normal type of credit card or a prepaid travel card to be used in conjunction with the system 10. The customer would swipe their card 12 at the end of the ride when the fare is due.

Lights 26 indicate the validity of the card 12. If the card 12 is swiped and is then not accepted the red light is activated. However, if the card 12 is accepted, the green light is activated.

The speaker 28 transmits the sounds of the system 10. For example, it could have a greeting to the patron when they get into the taxi. Once the fare is due, it announces the price of the fare to the patron. Also, along with the red light, if the card is not accepted, a buzzer goes off. If accepted, the green light activates and a bell sounds. To conclude the transaction something like "have a good day" is heard from the speaker 28. In the international version, if the Spanish flag is selected, it would give the message in Spanish.

The screen 30 shows the miles traveled, price per mile, and the total far due. It also indicates on the screen "swipe card now" so the patron knows when to use their card 12. Also, it will show the conversion from the country the patron is in to the country selected. This feature cuts down the required communication between the patron and the driver. And the patron wouldn't feel as though they are being taken advantage of.

A receipt 14 is discharged from the receipt port 32 so the patron can take it for their records. Most foreign countries do not offer receipts, so this option could come in handy for someone away on business.

The array 40 of accuator buttons 42, 44, 46 and 48 depict the flags of some commonly visited countries around the world. When the patron gets into the taxi they can select one of the buttons representing their country and get a greeting and the use directions in their language. They would not have to try to make contact with a foreign driver they may not be able to communicate with.

Figure 4:
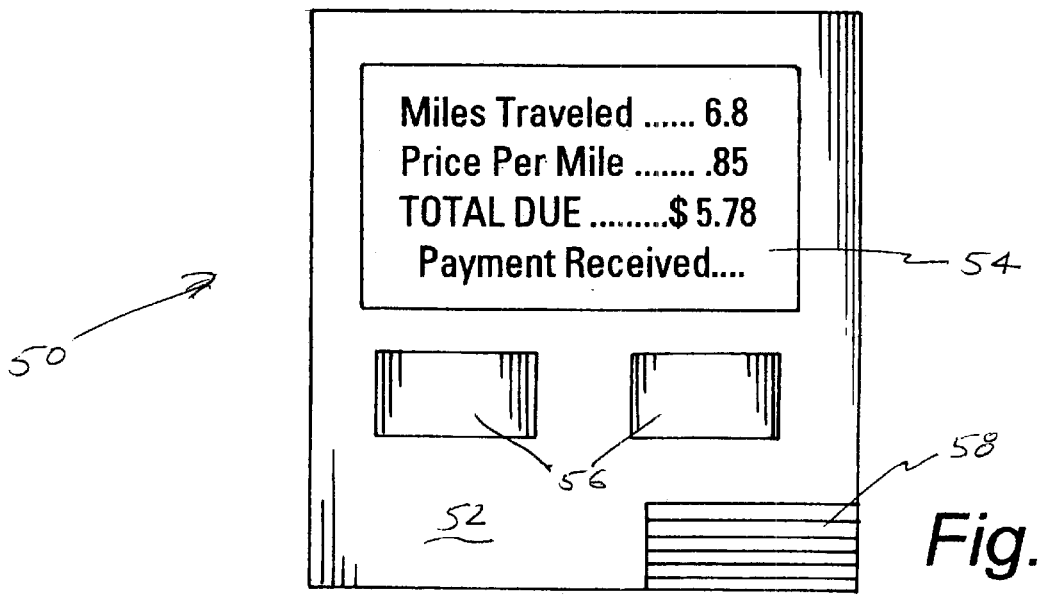
FIG. 4 is a front elevational view of the driver control box.

The driver control box 50 shown in FIG. 4 is electronically coupled to the patron box 20, 20a. The driver box 50 includes a housing 52, a display screen 54, card validity indicator lights 56 and a speaker 58. The housing 52 is a plastic enclosure which houses the various functions of the system 10. The housing 52 is mounted on the dashboard allowing the driver access to the same information as the passenger. The display screen 54 shows the information such as the fare due, miles traveled, and cost per mile. The lights 56 show the driver if the passenger's credit card 12 is accepted or not. If the red light flashes, it means that the card is declined and a buzzer sounds. If the green light flashes, it means that the card 12 is good and a bell sounds. The speaker 58 emits the sounds of the buzzer, and bell, and other sounds.

The system 10 is designed to be used in the transportation industry; namely, limousines, taxis or courier services. It is a mounted electronic credit card swipe mechanism that allows the passenger to swipe their credit card without having to hand the card to the driver. The key unique features with this device are that it will tell the passenger the running amount of the fare, both in that country's currency and the passenger's country's currency. For example, if an American goes to London, the LED display will show a running total of the fare in pounds. The user can simply press the button bearing the American flag and it will show the conversion over to dollars. If the American is in a country like France that has a different language, it will also through a synthesizer voice chip audibly tell the user how much the fare is in French, and then audibly tell the passenger what the fare is in English.

In operation, the user will press the button that displays their country's flag. This will convert the device over to that particular language and will automatically convert the currency on the LED display 30. It will display the rate per mile or kilometer, the number of miles or kilometers the passenger has been taken, and the fare due in two currencies. Also, it will speak through a speaker to greet, say "thank you" and audibly indicate what the final fare is in that country's currency, or the passenger's country's currency. This is all accomplished through a built-in microprocessor that converts the currencies. Both the screen 30 and the receipt 14 will show both currencies for the passenger.

The debit card swipe system 10 is primarily designed for transportation vehicles that charge fares. It could also be used by other types of companies that provide cash-on-deliver (COD) services such as Fed Ex, UPS and others.

As best illustrated in FIG. 3, power for the device is derived from the vehicle's battery. The device is interconnected with the existing vehicle fare meter and the output is transmitted to the debit card swipe system 10. The passenger "depresses" the appropriate language pushbutton 42, 44, 46 or 48 and the voice synthesizer circuitry greets the person in the selected language. The microprocessor powers up and begins tabulating the fare from the input it receives from the existing fare meter. When the fare ends and totals up, the passenger sees the total fare in both languages on the screen 30. The passenger runs their credit card 12 through the slot 24 in the debit card swipe system 10. The analog cellular telephone system makes contact with the credit agency and the magnetic strip information and cost is forwarded and to debit the card. At this point, one of two actions can occur; either the debit is accepted and the "green" light is illuminated and the bell sounds, or the debit is rejected and the "red" light is illuminated and the buzzer sounds.

It should be noted that some delay in receiving credit card charge approval or rejection can be expected. The delay can be of the same duration as those at stores when credit card charges are made. Also, a disclaimer would be posted on the face of the customer box 20, 20a telling the passenger how often the currency exchange rates are reprogrammed into the device. The United States version of the debit card swipe system 10 would not have the flag emblazoned pushbuttons. All other aspects of the debit card swipe system 10 would be the same as the international version.

The major benefits of the debit card swipe system 10 include the fact that no cash is needed. There are no currency exchange or calculations to make. There is no need to try and communicate with the driver in their language, and no need to negotiate the cost of the fare, as is common in many foreign countries. The patron gets a receipt in both the local currency and the country-of-choice currency. In many foreign countries, taxis do not issue receipts which are usually required for business expense accounts. The LCD screen 30 shows the distance traveled in miles/kilometers, cost per billing increment and total price of the fare in the native and foreign language. There is the added safety for the driver and passenger not having to carry cash. Only minimal communication is required between the driver and the patron. Also, the device could be used to provide other services in hotels, airports, sports stadiums, and other locations, and companies such as Fed Ex, UPS and couriers that require cash on delivery (COD) could also use the debit card swipe system 10.

Variations of the system 10 could employ a cellular communications system with satellite uplink capability to insure that there is no interruption in communication by cellular company zoning and blackout areas. Another variation could incorporate a global positioning system (GPS) unit where coordinates and location could be displayed with a map that can be viewed by the driver. Still another variation could accept only a universal debit card—similar to a telephone debit card. This would eliminate the need for the analog cellular communications equipment and increase the speed of the transaction. Also, a variation could be provided that utilizes microwave communications to finalize the transaction. Finally, transportation debit cards could be incorporated. These cards are sold by the respective government or local authorities of the country in which the tourist happens to be traveling. These also could be purchased from a debit card-issuing machine at airports, bus stations, banks and currency exchanges.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An electronic credit card swipe system for taxis consisting of:

a customer card swipe box located in a passenger compartment of the taxi, the swipe box including a housing, a card slot formed in the housing, a first set of card validity indicator lights carried on the housing, a first speaker mounted within the housing, a first display screen disposed on the housing, and a receipt discharge port formed in the housing;

a driver control box located in a driver area of the taxi and being electronically coupled to the swipe box, the control box including an enclosure, a second set of card validity indicator lights carried on the enclosure, a second speaker mounted within the enclosure, and a second display screen disposed on the housing;

wherein the swipe box further includes a plurality of foreign language actuator buttons disposed on the housing for selective activation by the passenger;

wherein each of the actuator buttons carries one of a plurality of indicia of one of a plurality of foreign languages; and wherein each indicia is a depiction of a flag associated with one of the plurality of foreign languages.

* * * * *